R. G. POPP.
TAXIMETER.
APPLICATION FILED APR. 20, 1909.
1,016,518.
Patented Feb. 6, 1912.
4 SHEETS—SHEET 1.
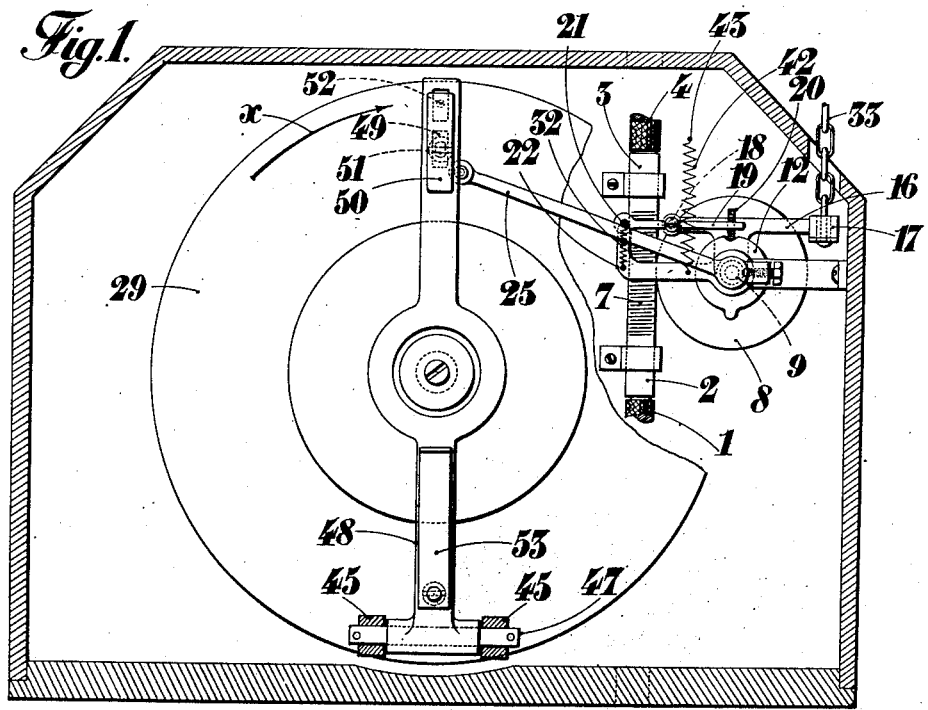
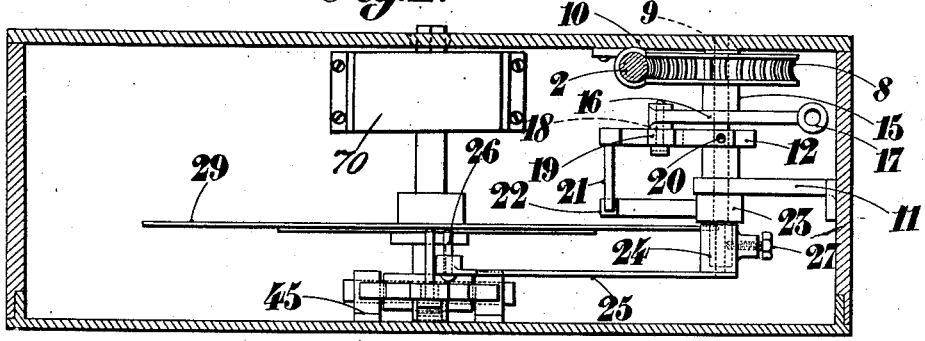

R. G. POPP.
TAXIMETER.
APPLICATION FILED APR. 20, 1909.
1,016,518.
Patented Feb. 6, 1912.
4 SHEETS—SHEET 2.
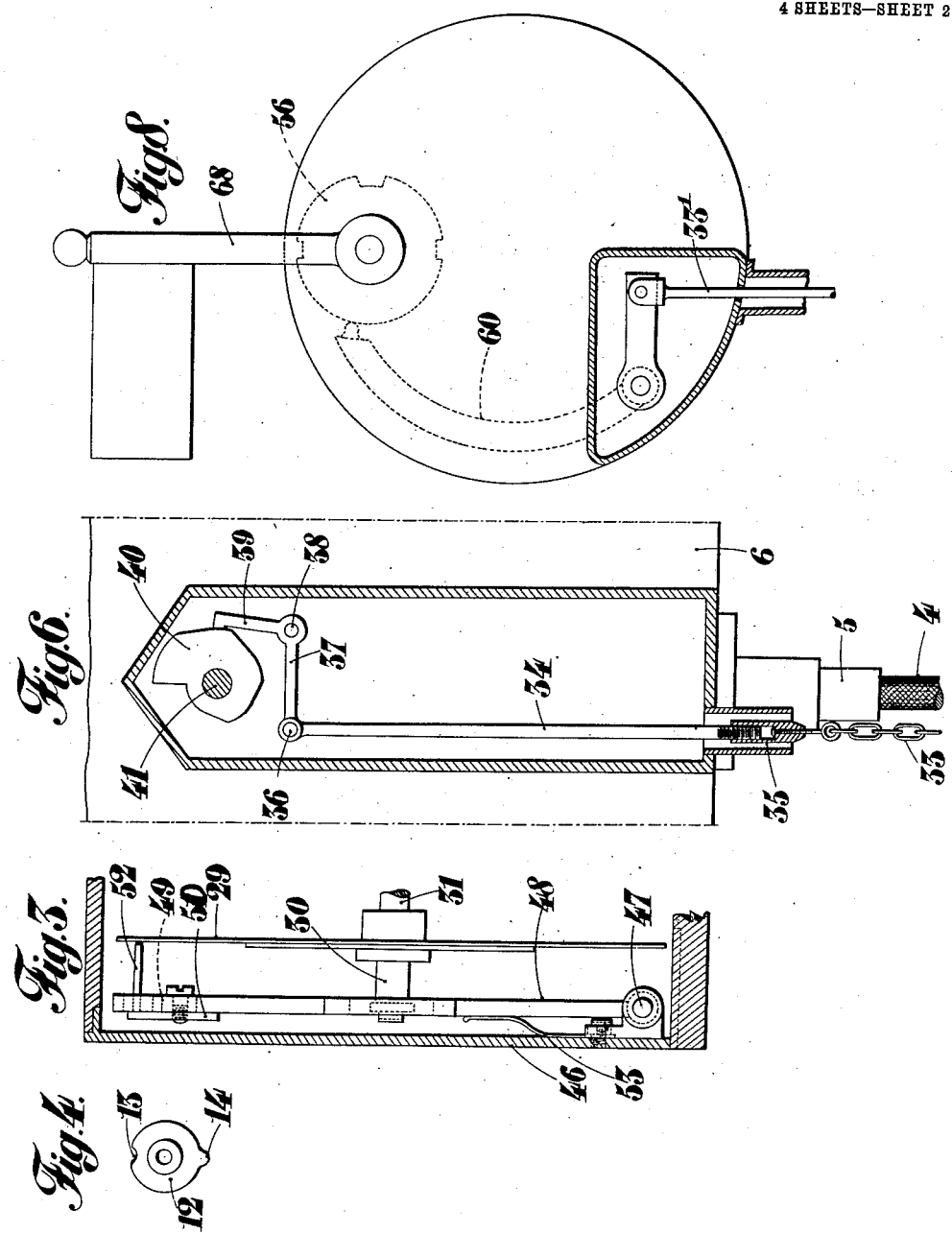

R. G. POPP.
TAXIMETER.
APPLICATION FILED APR. 20, 1909.
1,016,518.
Patented Feb. 6, 1912.
4 SHEETS—SHEET 3.
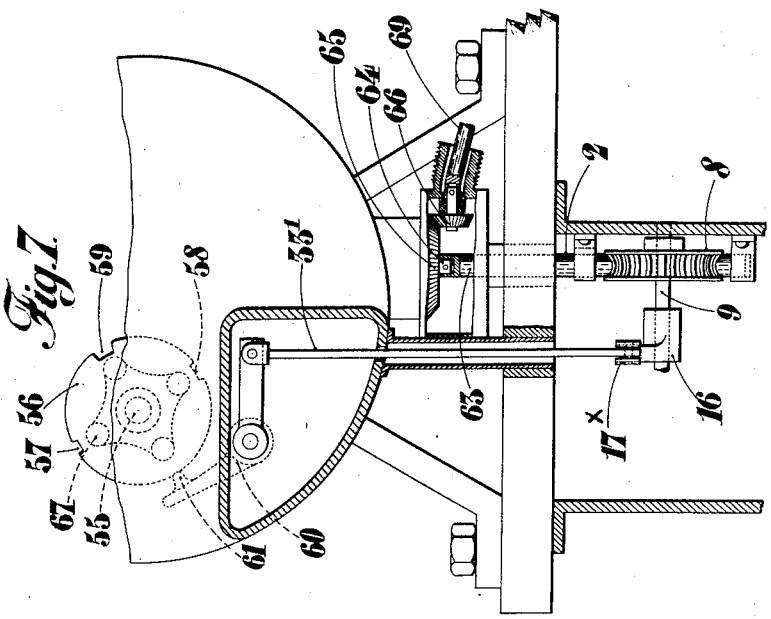
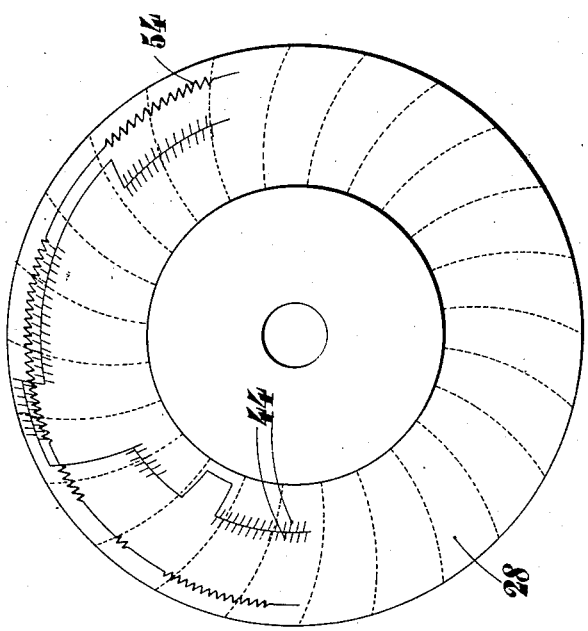

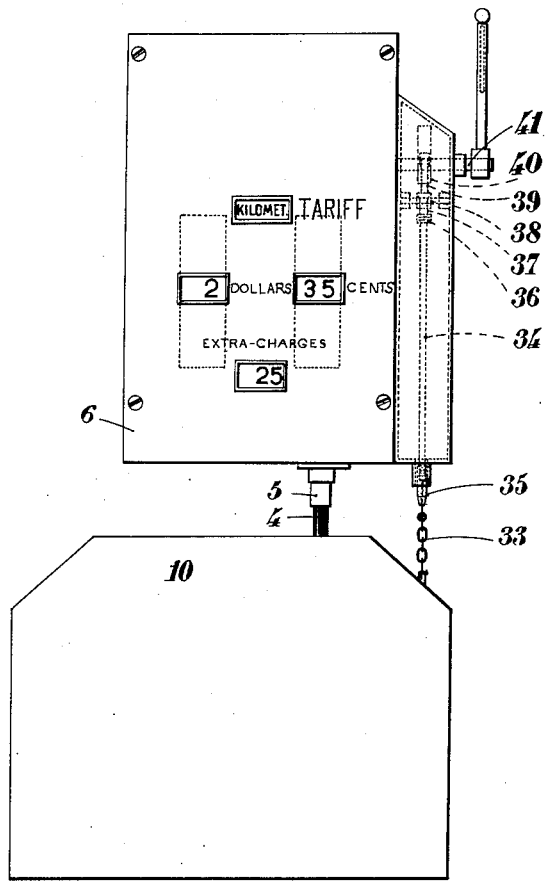

UNITED STATES PATENT OFFICE.

RICHARD GEORGES POPP, OF PARIS, FRANCE, ASSIGNOR TO THE SOCIÉTÉ GÉNÉRALE DES COMPTEURS DE VOITURES (TAXIMÈTRES,) OF PARIS, FRANCE, A CORPORATION OF FRANCE.

TAXIMETER.

1,016,518.   Specification of Letters Patent.   Patented Feb. 6, 1912.

Application filed April 20, 1909. Serial No. 491,085.

*To all whom it may concern:*

Be it known that I, RICHARD GEORGES POPP, citizen of the French Republic, residing at Paris, Department of the Seine, in France, have invented certain new and useful Improvements in Taximeters; and I do hereby declare the following to be a full, clear, and exact description of the invention, such as will enable others skilled in the art to which it appertains to make and use the same.

The present invention has for its object a checking apparatus for taximeters which serves to record the different conditions under which the vehicle runs, such as the times of departure and arrival for each journey, the number of hirings and so forth. The record is made upon a sheet of paper and it is only necessary to inspect this in order to discover any fraud on the part of the driver.

In the accompanying drawing: Figure 1 is a vertical longitudinal section of the checking apparatus. Fig. 2 is a horizontal section. Fig. 3 is a vertical transverse section showing the trembler and a method of mounting the trembler. Fig. 4 shows the profile of the cam employed. Fig. 5 represents a diagram obtained with this apparatus. Fig. 6 shows the operation of the checking apparatus by a Popp taximeter. Fig. 6ª shows in elevation the general relation of the checking apparatus to a Popp taximeter. Fig. 7 shows the combination of the checking apparatus with a Bruhn taximeter. Fig. 8 shows the manner in which the apparatus is operated in the case of a Schneider taximeter.

A flexible shaft-section 1 operated by the wheels of the vehicle is connected with the shaft 2 which drives the checking apparatus. The other extremity 3 of the shaft 2 receives another flexible shaft-section 4, which is connected with the operating sleeve 5 of the taximeter 6; a worm 7 arranged upon the shaft 2, meshes with a worm wheel 8, keyed upon a horizontal shaft 9 journaled in the plates 10 and 11. This shaft likewise carries a cam 12, presenting a notch 13 and a projection 14, diametrically opposite to the notch.

A sleeve 15 loosely mounted on the shaft 9 is rigidly connected with a lever 16, one of the extremities 17 of which is connected with the taximeter by an appropriate transmission member, while the other extremity carries a shaft 18 upon which a two armed lever 19 rocks; one of these arms is provided with an adjustable screw 20 which contacts with the cam 12, while the other arm carries a tappet 21 which strikes against a tappet 22 solid with a sleeve 23, which is itself mounted loosely on the shaft 9. With its extremity carrying the stylus 26 the hand 25 is rigidly connected with a sleeve 24 which is fixed to the sleeve 23 by means of a screw 27. This screw enables the position of the hand to be regulated once for all, by fixing the sleeve 24 upon the sleeve 23.

The disks of paper 28 upon which the stylus 26 marks, are arranged upon the dial 29 where they are held by the nut 30 (Fig. 3) which is screwed upon the spindle 31 of the dial.

The spindle 31 forms part of a clockwork mechanism 71, which is inclosed in the box and drives the dial through the connections described. For example the speed may be such that this dial makes a complete revolution every 24 hours. In this case the disks of paper are provided with twenty-four radial divisions (Fig. 6) the distance separating two consecutive radii corresponding to a period of one hour.

A spring 32 invariably tends to apply the tappet 21 to the bent lever 22; under the influence of a spring 42 another purpose of which is hereinafter explained, and which tends to bring the arm 22 toward the fixed point 43, the screw 20 always remains in contact with the cam 12 which produces at each revolution of this cam two successive displacements of the hand 25 in opposite directions the first corresponding to the passage in the cavity 13 and the second to the passage over the projection 14.

In the case of a Popp taximeter, the checking apparatus is connected with the flag of the taximeter in the following manner. The chain 33 is fixed to the extremity 17 of the lever 16 and also to the rod 34 (Fig. 6) by the intermediary of a threaded sleeve 35 which enables its tension to be regulated. The rod 34 is pivoted at 36 to a bent lever 37 mounted on a shaft 38 and the arm 39 of this lever bears upon a cam 40 keyed on the flag shaft 41. This cam presents a number of faces corresponding to the different positions of the flag. The box containing this mechanism is fixed to the lateral walls of the taximeter 6.

The spring 42 (Fig. 1) fixed at 43 tends to lift the lever 22 and by the intermediary of the tappet 21 of the lever 19, one extremity of which as already stated rests upon the cam 12, and also of the lever 19 it exerts traction upon the small chain 33 which insures contact between the arm 39 and the cam 40. The spring 42 likewise tends to move the hand 25 in the direction indicated by the arrow $x$. The result is that for each position of the flag one of the faces of the cam 40 will come opposite the arm 39 thereby causing a corresponding displacement of the rod 34, chain 33, lever 16, and finally of the stylus 26 on the hand 25.

The dial being constantly in movement the stylus will make a mark situated at a greater or less distance from the spindle 31, according to the face of the cam which is in contact with the arm 39.

If the vehicle is running, the flexible transmission drives the shaft 2 which for a given distance (two kilometers for example) causes the wheel 8 to effect a complete revolution and with it the shaft 9 and the cam 12; at each half revolution, that is to say, in the example here selected, at every kilometer the cam 12 acts upon the hand 25 and the stylus 26 and draws on one side or the other of the circle that it traverses, small radial lines 44 (Fig. 5) of the same amplitude whatever may be the radius of the arc of a circle described, because the action of the cam 12 is independent of the position of the hand 25.

The diagram represented in Fig. 5 shows the small lines drawn by the stylus carried by the hand. In the example selected these lines may occupy five different positions, corresponding to the five faces of the cam 40 and consequently to the five positions of the flag ("disengaged", "tariffs 1, 2, 3" and "break down"), the position "disengaged" corresponding to the position closest to the outer edge of the disk. Obviously an examination of this diagram will readily show the number of kilometers traversed by a vehicle in a given time; to do this it is only necessary to count the number of small radial lines. The number of kilometers traversed on each tariff can likewise be ascertained. If the time of starting is known, that is to say, the time corresponding to the initial position of the hand, if the total duration of the rotation of the disk is also known, the time of each hiring, of each stoppage, and so forth can be found.

Fig. 7 illustrates the combination of the checking apparatus with a Bruhn taximeter. The shaft 55 for altering the tariff which is operated by means of a handle 67 in this case carries a disk 56 in which three notches are formed; of these notches 57 and 58 are diametrically opposite and are of the same depth while the third notch 59 which is deeper is arranged at 90° to the others.

The taximeter carries a bent lever 60 one of the arms of which carries a finger 61, which like the finger 31 when the apparatus is fitted to the Popp taximeter (Fig. 6) is held permanently in contact with the edge of the disk 56. The lever 60 is pivoted to a rod 33′ which is connected with the extremity $17^x$ of the lever 17 of the checking apparatus.

In the case of the Bruhn taximeter, the shaft 2 which carries the endless screw 7 is connected by a resilient joint 63 with a shaft 64, which receives the movement of the flexible transmission 69 by means of a bevel gear 65—66.

The rotation of the handle 67 for altering the tariff enables four different positions to be given to the disk 56; the rod 33′ thus assumes a given position according to the part of the disk which is in contact with the finger 61. The result in the case of the Bruhn taximeter is that the hand is able to assume three positions, two of them corresponding to the indications "Disengaged" and "Time distance tariff" respectively, and the third to "Payment" or "Distance". These two positions might also be distinguished by making the notches 57 58 of different depths.

Fig. 8 shows the application of the checking apparatus to a Schneider taximeter. In this case the flag 68 is keyed directly upon the notched disk 56. The transmission is effected by means of a bent lever 60 which as in the case of the Bruhn taximeter acts upon a rod 33′ connected with the checking apparatus.

In the case of a Japy taximeter, the hand is operated in the same manner, the only difference being that the disk 56 is provided with two notches only corresponding to the distance and time distance tariffs.

In order to render the check still more certain, a trembler may be added to the apparatus; this trembler marks upon the disk of paper a continuous line when the vehicle is at rest and a sinuous line such as 54 (Fig. 5) when the vehicle is running.

The trembler device represented in the accompanying drawing by way of example comprises two lugs 45 fixed to the cover 46 of the apparatus and between which there is mounted a shaft 47 which carries a lever 48 provided at its extremity with a slot 49 in which there moves a slide 50 supported by a screw 51 and carrying a stylus 52 held upon the disk of paper by a leaf spring 53 fixed to the cover and pressing against the lever 48. When the vehicle is at rest the point 52 remains stationary but the vibrations of the motor or the jolts to which the vehicle is subjected produce the displacement of the slide 50 and the line drawn has a sinuous form.

If a driver should detach or break the flexible transmission of the vehicle the want of agreement between the two indications upon the disk would enable the fraud to be discovered.

I claim:

1. The combination with a taximeter having means to indicate the conditions under which the vehicle is operated, of means to mount a recording element, and a single means coacting with said indicating means to record automatically on such recording element the adjustment of said indicating means and the distance traveled by the vehicle.

2. The combination with a taximeter having flag mechanism, of a checking attachment coacting with said flag mechanism, having continuously rotated means to support a record disk, and embodying a single means to record on such disk, by a continuous line running at different distances from the center of the disk, the different positions of the flag, and to record the distance traveled by the vehicle by short marks extending laterally from such continuous line.

3. The combination with a taximeter having flag mechanism, of a checking attachment coacting with said mechanism embodying means to mount a record disk, a single marker coacting with such disk, and means to effect automatically different movements of the marker to indicate the adjustment of the flag and the distance traveled by the vehicle, respectively.

4. The combination with a taximeter having flag mechanism, of a checking attachment for the taximeter coacting with said mechanism and comprising means to rotate a record disk, and a single means to record automatically on such disk the adjustment of the flag mechanism and the distance traveled by the vehicle.

5. The combination with a taximeter having flag mechanism, of a checking attachment for said taximeter comprising clock mechanism to rotate a record disk, a marker to bear against such disk, means to move the marker with respect to the disk to thereby record the distance traveled by the vehicle, and other means coacting with the flag mechanism, to move the marker with respect to the disk to record the adjustment of the flag mechanism.

6. The combination with a taximeter having flag mechanism, of a checking attachment for said taximeter comprising means to rotate a record disk, a marker to bear against said disk, a connection between the flag mechanism and said marker whereby the latter is moved with respect to the disk, to thereby record the adjustment of the flag mechanism, and means acting on the marker to move the same slightly away from the line drawn on the disk as the latter rotates, to thereby record the distance traveled by the vehicle.

7. The combination with a taximeter having flag mechanism, of a checking attachment therefor, comprising means to rotate a record disk, a marker to bear against said disk, whereby a line is drawn around the rotating disk, a connection between said marker and said flag mechanism whereby the record line is drawn at different distances from the center of the disk in accordance with different operating conditions of the vehicle, an operating shaft for the taximeter, and means actuated by said shaft to move the marker laterally away from the record line once in a predetermined number of rotations of said shaft.

8. The combination with a checking attachment for taximeters comprising means to mount a continuously rotated record disk, a marking hand to bear against such disk, and means driven by the movement of the vehicle to give the marking hand a small substantially radial movement when the vehicle has traveled a predetermined distance, of a taximeter having flag mechanism, and a connection between said flag mechanism and the marking hand by which the latter is automatically moved toward and away from the center of the record disk.

9. A checking attachment for taximeters comprising means to mount a continuously rotated record disk, and a trembler device comprising a spring pressed lever urged toward the face of such disk, and a freely displaceable slide guided in the lever and carrying a stylus or marker to bear against the record disk.

In testimony whereof I affix my signature, in presence of two witnesses.

RICHARD GEORGES POPP.

Witnesses:
LOUIS JOSSE,
DEAN B. MASON.